(12) United States Patent
Norimatsu et al.

(10) Patent No.: US 8,998,734 B2
(45) Date of Patent: Apr. 7, 2015

(54) THREAD FORMING TAP

(75) Inventors: Kentaroh Norimatsu, Toyokawa (JP);
Takayuki Matsushita, Toyokawa (JP);
Hironori Yamamoto, Toyokawa (JP)

(73) Assignee: OSG Corporation, Toyokawa-shi (JP)

( * ) Notice: Subject to any disclaimer, the term of this patent is extended or adjusted under 35 U.S.C. 154(b) by 768 days.

(21) Appl. No.: 13/379,535

(22) PCT Filed: Jul. 7, 2009

(86) PCT No.: PCT/JP2009/062360
§ 371 (c)(1),
(2), (4) Date: Dec. 20, 2011

(87) PCT Pub. No.: WO2011/004455
PCT Pub. Date: Jan. 13, 2011

(65) Prior Publication Data
US 2012/0107063 A1    May 3, 2012

(51) Int. Cl.
*B23G 7/02*    (2006.01)
(52) U.S. Cl.
CPC .......................................... *B23G 7/02* (2013.01)
(58) Field of Classification Search
CPC .............. B23G 5/06; B23G 5/062; B23G 7/02
USPC ........... 470/198, 199, 204; 408/215, 219, 220
See application file for complete search history.

(56) References Cited

U.S. PATENT DOCUMENTS

| 2,991,491 | A | * | 7/1961 | Welles, Jr. ..................... 470/204 |
| 3,390,410 | A | * | 7/1968 | Bridges ......................... 470/204 |
| 4,813,188 | A |   | 3/1989 | Becker et al. |
| 5,487,626 | A | * | 1/1996 | Von Holst et al. ............ 408/144 |
| 6,217,267 | B1 |  | 4/2001 | Sugano et al. |
| 6,685,573 | B2 |  | 2/2004 | Hikosaka et al. |
| 7,144,208 | B2 | * | 12/2006 | Henderer et al. ............. 408/144 |

(Continued)

FOREIGN PATENT DOCUMENTS

| CN | 101247916 A | 8/2008 |
| CN | 101400469 A | 4/2009 |

(Continued)

OTHER PUBLICATIONS

International Search Report mailed Oct. 6, 2009 issued in International Patent Application No. PCT/JP2009/062360 (with translation).

*Primary Examiner* — Edward Tolan
(74) *Attorney, Agent, or Firm* — Oliff PLC

(57) ABSTRACT

A thread forming tap has a full thread portion and a leading portion contiguous with the full thread portion and reducing in diameter toward its tip. The full thread and leading portions are provided with external thread on which lobes and recesses are alternately formed. When δ represents an angle around a tool center line toward a thread forming side, the shape of the lobe varies along a quadratic curve relative to angle δ so that relief amount increases toward inflection point angle δ. However, in a rough plastic deformation section where angle δ is greater than inflection point angle θ and exceeds the working region, the shape varies along an Archimedean curve with clearance angle α1 so that the relief amount increases linearly relative to angle δ, and a margin section is substantially zero or within a range where angle δ is less than or equal to 1°.

16 Claims, 5 Drawing Sheets

(56) References Cited

U.S. PATENT DOCUMENTS

| | | | |
|---|---|---|---|
| 7,815,512 B2 * | 10/2010 | Nakajima et al. | 470/204 |
| 7,927,221 B2 * | 4/2011 | Glimpel et al. | 470/204 |
| 8,186,915 B2 * | 5/2012 | Nakajima et al. | 408/222 |
| 2008/0268967 A1 | 10/2008 | Nakajima et al. | |
| 2009/0214311 A1 | 8/2009 | Nakajima et al. | |
| 2010/0260566 A1 * | 10/2010 | Glimpel et al. | 408/222 |

FOREIGN PATENT DOCUMENTS

| | | |
|---|---|---|
| JP | Y 1-35-24741 | 9/1960 |
| JP | A-62-4556 | 1/1987 |
| JP | A-2003-127027 | 5/2003 |
| JP | A-2004-148430 | 5/2004 |
| JP | A-2004-276085 | 10/2004 |
| JP | A-2006-239858 | 9/2006 |

* cited by examiner

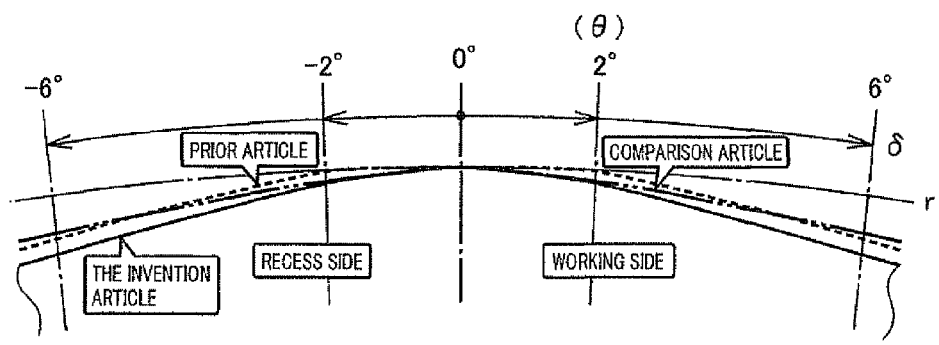
FIG.4(a) LOBE SHAPE
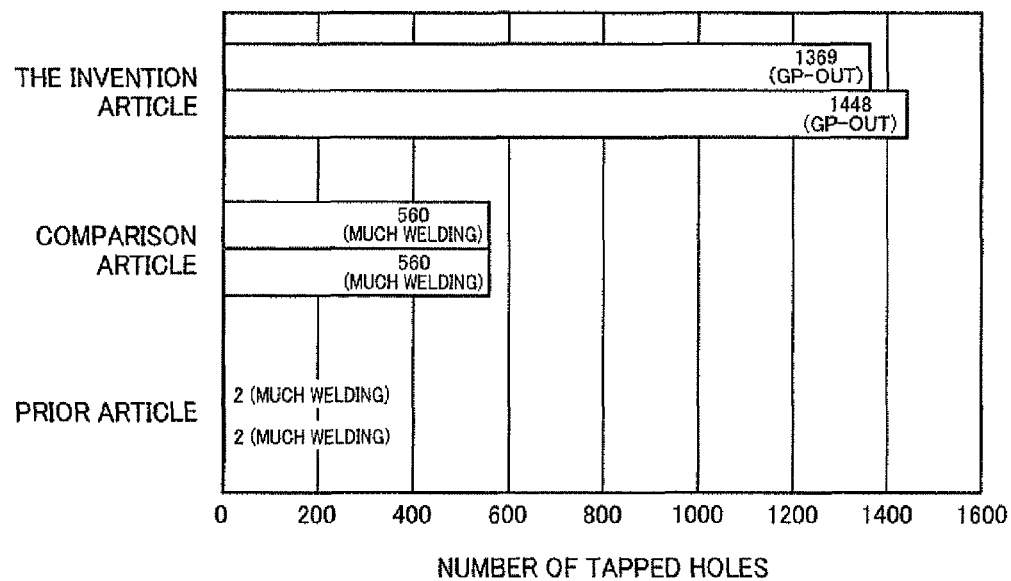
FIG.4(b) DURABILITY

FIG.5(a) DURABILITY
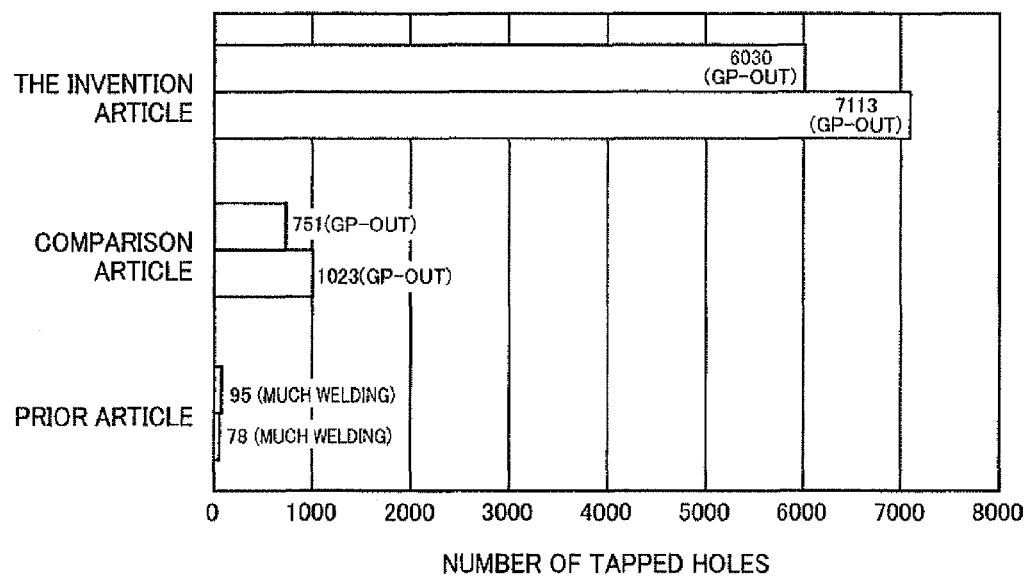
FIG.5(b) TAPPING TORQUE
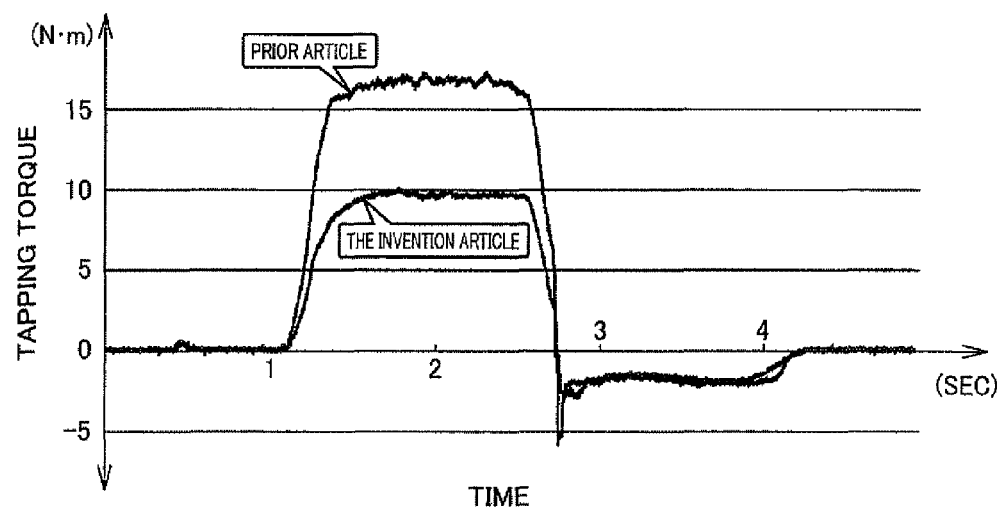

THREAD FORMING TAP

TECHNICAL FIELD

The present invention relates to a thread forming tap, and, more particularly, to a technique ensuring the acquisition of high durability even when an internal thread is formed under the conditions easy to cause welding during high-speed working, etc.

BACKGROUND ART

A thread forming tap is known that is provided with an external thread having a full thread portion and a leading portion disposed contiguous with the full thread portion and tapered toward the tip, both the full thread portion and the leading portion having lobes and recesses that are alternately formed thereon (see Patent Literatures 1 and 2). In such a thread forming tap, its leading portion is first screwed into a prepared hole disposed in a workpiece so that the lobes cut into inner wall surfaces of the prepared hole to cause a plastic deformation for the formation of an internal thread, with the result that no chips are created simplifying clearing works, etc.

CITATION LIST

Patent Literature

PTL 1: JP2003-127027A
PTL 2: JP2004-148430A

SUMMARY OF THE INVENTION

Technical Problem

By the way, the lobes of such a thread forming tap generally have margins whose radial dimensions are unvaried over the angular range of the order of 2 to 6 degrees at the peripheral portion around the tool center line O, whereupon a large friction torque (rotational resistance) occurs e.g., when tapping is carried out at a high speed or when steel with a relatively high hardness (of the order of e.g., 30 HRC or more) is tapped, as a result of which the occurrence of welding due to heat generation may remarkably impair the tool life.

The present invention was conceived in view of the above circumstances and an object thereof is to suppress the heat generation when the internal thread is formed by the plastic working to thereby prevent welding of the workpiece material onto the tool, while simultaneously suppressing the tool wear by the reduction of the thermal influence to thereby improve the tool life. The suppression of welding enables the internal thread working to be carried out at a high speed.

Means for Solving the Problems

To achieve the object, the first invention provides a thread forming tap having a full thread portion and a leading portion disposed contiguous with the full thread portion and reducing in diameter toward its tip, the full thread portion and the leading portion being provided with an external thread on which lobes and recesses are alternately formed, wherein (a) when, with respect to a shape around a tool center line O of the lobe in the leading portion, $\delta$ represents an angle around the tool center line O toward thread forming side from a top of the lobe of 0° having a maximum radial dimension, in a range on at least the thread forming side from the top of the lobe and beyond a working region where the leading portion cuts into a workpiece for thread forming, (b) in a finishing plastic deformation section where the angle $\delta$ is less than or equal to an inflection point angle $\theta$ that is predefined within the working region, the shape of the lobe is defined so as to vary along a quadratic curve relative to the angle $\delta$ so that relief amount R, which is amount of recession from a radial dimension at the top of the angle $\delta=0°$, increases toward the inflection point angle $\theta$, whereas (c) in a rough plastic deformation section where the angle $\delta$ is greater than the inflection point angle $\theta$ and is defined to exceed the working region, the shape of the lobe is defined so as to vary along an Archimedean curve with a certain clearance angle $\alpha 1$ so that the relief amount R increases linearly relative to the angle $\delta$, and (d) a margin section with a radial dimension equal to the radial dimension of the top is substantially zero or is within a range where the angle $\delta$ is less than or equal to 1°.

The second invention provides the thread forming tap recited in the first invention, wherein in case of absence of the margin, the finishing plastic deformation section is within a range from the top of the angle $\delta=0°$ up to the inflection point angle $\theta$, whereas in case of presence of the margin, the finishing plastic deformation section is within a range from an outer end of the margin up to the inflection point angle $\theta$.

The third invention provides the thread forming tap recited in the first or second invention, wherein (a) the inflection point angle $\theta$ is defined within a range of $0°<\theta \leq 4°$ and, when the margin is present, within a range outside of the margin, wherein (b) the clearance angle $\alpha 1$ is defined within a range of $2° \leq \alpha 1 \leq 12°$, and wherein (c) in the finishing plastic deformation section, the clearance angle $\alpha$ gradually increases toward the inflection point angle $\theta$ to reach the clearance angle $\alpha 1$ in the vicinity of the inflection point angle $\theta$ to smoothly connect to the rough plastic deformation section.

The fourth invention provides the thread forming tap recited in any one of the first to third inventions, wherein shape of a recess side opposite to the thread forming side with respect to the top of the angle $\delta=0°$ varies symmetrically with that of the thread forming side.

The fifth invention provides the thread forming tap recited in any one of the first to fourth inventions, wherein shape of the lobe having the finishing plastic deformation section and the rough plastic deformation section is shape of one or both of a flank and a crest of the external thread on the lobe.

The Effects of the Invention

In such a thread forming tap, within a narrow range of substantially zero margin section or the angle $\delta$ of 1° or less is provided for the shape on the thread forming side from the top of the lobe, with the result that the area of contact with the workpiece upon the thread forming (rolling working) is reduced, lowering the friction torque (rotational resistance) and heat generation. Furthermore, with the finishing plastic deformation section and the rough plastic deformation section such that in the rough plastic deformation section apart from the lobe top ($\delta=0°$) the lobe describes the Archimedean curve along which the relief amount R varies linearly with respect to the angle $\delta$ whereas in the finishing plastic deformation section near the top the shape of the lobe is formed so as to vary along the quadratic curve with respect to the angle $\delta$, with the result that the variations of the relief amount R become small in the vicinity of the top on which a large working load acts, to ensure a smooth thread forming work, lowering the friction torque and the heat generation without impairing the durability (wear, damage, etc.) of the lobe.

In this manner, according to the thread forming tap of the present invention, the friction torque and heat generation are reduced without impairing the durability (wear, damage, etc.) of the lobe by virtue of the reduction of the margin section and the specialized shape of the lobe, whereupon even when the internal thread is formed under the condition that welding is apt to occur due to high-speed working, a low-lubricative oil, etc., the occurrence of welding and the wear and damage of the lobe are suppressed, contributing to the improvement of the tool life. In addition, the application to materials becomes possible such as relatively hard high-carbon steel or alloy steel (more than approx. 30 HRC) of which thread tapping has hitherto been difficult to perform, without being limited to low-carbon steel having a good extensibility.

In the third invention, the inflection point angle $\theta$ is defined within the range of $0° < \theta \leq 4°$ and when the margin is present, within a range outside of the margin, and the clearance angle $\alpha 1$ is defined within the range of $2° \leq \alpha 1 \leq 12°$ whereas the clearance angle $\alpha$ gradually increases toward the inflection point angle $\theta$ in the finishing plastic deformation section so that the clearance angle $\alpha 1$ is achieved in the vicinity of the inflection point angle $\theta$ to smoothly connect to the rough plastic deformation section, whereupon the thread forming work is more smoothly performed, resulting in a proper reduction of the friction torque and of the heat generation without impairing the durability (wear, damage, etc.) of the lobe.

In the fourth invention, the lobe has a symmetrical shape with respect to the top so that the margin section is less than or equal to 2° as a whole, with the result that the area of contact with the workpiece becomes small to properly lower the friction torque and the heat generation, ensuring a simple and low-cost configuration with easy designing as compared with the case where the shape of the recess side is set separately from that of the working side.

BRIEF DESCRIPTION OF THE DRAWINGS

FIG. 4 is a diagram for explaining the result conducted a durability test using two articles of the present invention, comparison purposes, and the prior art, respectively, (a) is a diagram depicting the shape of a lobe by comparison, and (b) is a diagram depicting the number of tapped holes up to the tool life by comparison.

FIG. 5 depicts the case where a durability test using two articles of the present invention, comparison purposes, and the prior art, respectively is conducted, (a) is a diagram depicting the number of tapped holes up to the tool life by comparison, and (b) is a diagram depicting the measuring result of the tapping torque in the present invention and the prior art by comparison.

DESCRIPTION OF EMBODIMENTS

Figure 1A:
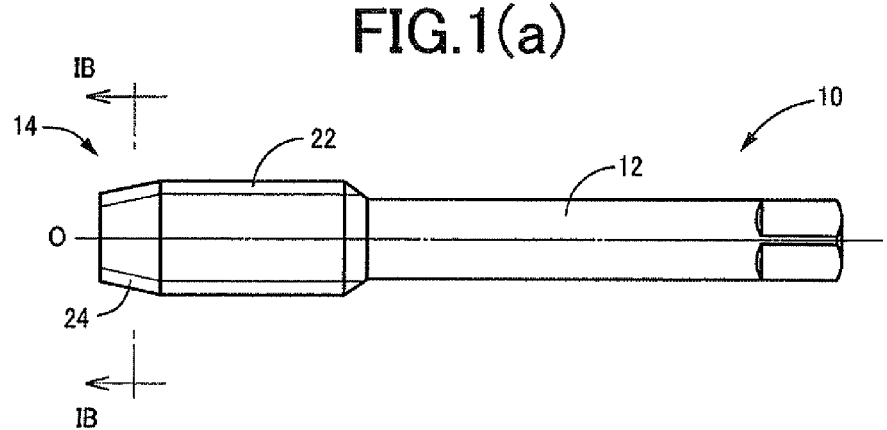
FIG. 1 is a diagram for explaining a thread forming tap that is an example of the present invention, (a) is a front view, (b) is an enlarged view of 1B-1B section in (a), and (c) is a diagram depicting in further enlarged scale the vicinity of a top of a lobe in (b).

A thread forming tap of the present invention is used such that its leading portion is first screwed into a prepared hole disposed in a workpiece so that the lobes cut into inner wall surfaces of the prepared hole to cause a plastic deformation for the formation of an internal thread, with the result that no chips are created simplifying clearing works, etc. Various modes are conceivable in such a manner e.g., that the tap may integrally have at its tip a drill or a reamer for forming a prepared hole or that the tap may integrally be disposed with a minor-diameter finishing edge for finishing the minor diameter of the internal thread.

The thread forming tap preferably has a plurality of lobes in three or more lines equi-angularly around an axis so as to be continuous in parallel with an axis, but various modes may be possible in such a manner e.g., that the lobes in lines may be arranged so as to be continuous spirally around the axis or that they may be arranged at unequal intervals around the axis. If necessary, an oil groove, etc. for supplying cutting oil may be axially disposed so as to divide the external thread.

Since the thread forming tap produces no chips, it can apply satisfactory tapping to both a blind hole and a through hole to fault an internal thread therein. According to the present invention, even when the internal thread is formed under the condition that welding is apt to occur due to high-speed working, a low-lubricative oil (e.g., a water-soluble lubricant) etc., the friction torque or the generation of heat is reduced to suppress the welding without impairing the durability of the lobe, contributing to the improvement of the tool life. It is however natural that the thread forming may be carried out at a low speed or using a lubricant with a relatively high lubricative performance such as a water-insoluble lubricant.

Although it is desirable to eliminate a margin section having a radial diameter equal to the radial dimension of the lobe top but instead to impart a quadratic curve shape from the angle $\delta = 0°$, the margin may be present within a range where the angle $\delta$ is not more than 1°. A smaller margin is preferred. Although such a shape of the lobe of the external thread may be formed e.g., by controlling with a cam, etc. the distance between a grinding wheel for grinding the external thread and a tap material, the present invention is related to the shape of the lobe of the external thread and therefore the method of manufacturing the same is not limitative in particular, allowing the present invention to be applied also to the case where the external thread of the thread forming tap is formed by use of a manufacturing technique other than the grinding wheel.

A relief amount R of the finishing plastic deformation section where the shape of the lobe is varied along a quadratic curve with respect to the angle $\delta$ is defined so as to reach a minimum (=0) at the angle $\delta = 0°$ or at an outer end of the margin section for example to thereafter increase in a quadratic function manner according as the angle $\delta$ increases. Such a quadratic curve is preferably set such that a clearance angle $\alpha$ continuously increases to reach substantially the same clearance angle as a clearance angle $\alpha 1$ of the rough plastic deformation section at an inflection point angle $\theta$. It is preferred for example to set the quadratic curve of the lobe such that the clearance angle $\alpha$ continuously varies between 0.1° and $\alpha 1$. Geometrically strict quadratic curve and Archimedean curve may not necessarily be used when varying the shape of the lobe along the quadratic curve and when varying the shape of the lobe along the Archimedean curve, and some errors may occur due to the working errors, etc. upon grinding by the grinding wheel. In other words, the target shape of the lobe defined by an approach-retraction pattern, etc. of the grinding wheel may be a quadratic curve or an Archimedean curve.

The shape of the lobe defined based on the quadratic curve and the Archimedean curve may be formed by mechanically relatively moving the grinding wheel closer to or away from the tap material by use of a cam manufactured corresponding to the variations of the radial dimensions thereof (variations of the relief amount R), but instead the grinding wheel may be moved closer to or away from the tap material by use of electrical signals under NC control, etc. Machining of the external thread generally includes groove grinding of the groove portions and periphery grinding of the crests that are separately performed, and the shape of the lobe of the present invention may be applied to either the flank formed by the groove grinding or the crest formed by the periphery grinding, but preferably the shape of the lobe of the present invention is applied to both. It is preferred in particular that the lobe shape of the present invention apply to the shape of the vicinity of the peripheral edge of the flank (the vicinity of the crest) involved largely in the friction torque or the heat generation as a result of cutting into the workpiece. The lobe shape may be measured by use of, e.g., a stylus type surface roughness tester.

Although in the third invention the inflection point angle $\theta$ is set within a range of $0° < \theta \leq 4°$ and the clearance angle $\alpha 1$ is set within a range of $2° \leq \alpha 1 \leq 12°$, it is more preferable that the inflection point angle $\theta$ be within a range of the order of $1° \leq \theta \leq 3°$ and the clearance angle $\alpha 1$ be within a range of the order of $4° \leq \alpha 1 \leq 8°$. Upon the execution of the first invention, the inflection point angle $\theta$ and the clearance angle $\alpha 1$ may be set beyond the range described above depending e.g., on the nominal designation of the external thread or on the hardness of the workpiece.

Although in the fourth invention the shape of the recess side opposite to the thread forming side with respect to the lobe top of the angle $\delta = 0°$ is also formed so as to be symmetrical with that of the thread forming side, since the recess side is hardly involved in the thread forming, the recess side may be of a lobe shape properly set separately from the thread forming side in consideration of a contact arising from a resilience of the workpiece such that e.g., the lobe shape is varied along the quadratic curve beyond the inflection point angle $\theta$ from the lobe top ($\delta = 0°$) or that the lobe shape is varied along the Archimedean curve directly from the lobe top ($\delta = 0°$).

Although the present invention defines the lobe shape in at least the leading portion based on the quadratic curve and the Archimedean curve, the lobe shape in the full thread portion may appropriately be set separately from that of the leading portion. By way of example, similar to the leading portion, it may be defined based on both the quadratic curve and the Archimedean curve, but instead it may be defined based on only the quadratic curve or only the Archimedean curve, or otherwise the other shapes may be employed. It is to be noted that a first full thread portion positioned at the forefront of the full thread portion and involved in the thread forming belongs to the leading portion.

A method of setting the shape of the lobe in a thread forming tap of any one of the first to fifth inventions includes for example (a) a step of determining the inflection point angle $\theta$, the relief amount Rc at the inflection point angle $\theta$, and the clearance angle $\alpha 1$ in the rough plastic deformation section and (b) a step of determining a quadratic curve in the finishing plastic deformation section so that at the inflection point angle $\theta$, the relief amount R is the relief amount Rc with the clearance angle $\alpha$ being the clearance angle $\alpha 1$.

The inflection point angle $\theta$ and the clearance angle $\alpha 1$ are set in consideration of e.g., the nominal designation of the external thread and the hardness of the workpiece. By way of example, when the nominal diameter is large, the inflection point angle $\theta$ is set to be smaller and the clearance angle $\alpha 1$ is set larger than when the nominal diameter is small. When the hardness of the workpiece is high, the inflection point angle $\theta$ is set to be smaller and the clearance angle $\alpha 1$ is set larger than when the hardness is low.

The relief amount R in the rough plastic deformation section where the shape is defined in accordance with the Archimedean curve with a certain clearance angle $\alpha 1$ can be expressed by expression (1) which follows using the relief amount Rc at the inflection point angle $\theta$ and the nominal diameter D of the external thread.

$$R = \{D^* \pi^* (\delta - \theta)/360\}^* \tan \alpha 1 + Rc \quad (1)$$

The thread forming tap of the present invention is made of a tool material such as hardmetal or high-speed tool steel. If needed, compound coating of TiN, TiCN, TiAlN, CrN, etc. or hard coating such as DLC (Diamond Like Carbon) coating and diamond coating may be applied thereto, or instead steam treatment or the nitriding treatment may be applied thereto.

EXAMPLES

Examples of the present invention will now be described in detail with reference to the drawings.

Figure 1B:
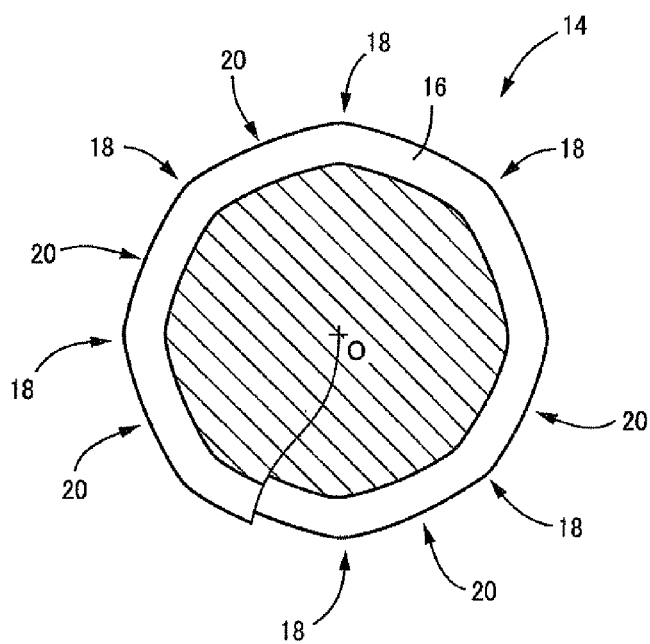

FIG. 1 is a diagram for explaining a thread forming tap 10 that is an example of the present invention, the thread forming tap 10 being in the form of a right-hand screw with the nominal designation: M10*1.5, the number of lobes: 8, and the bevel lead angle: 10°, the tool material being high-speed tool steels, with its surface being coated with TiCN film that is a hard coating. (a) of FIG. 1 is a front view from a direction orthogonal to a tool center line O, (b) is an enlarged view of 1B-1B section in (a), and (c) is a diagram depicting in further enlarged scale the shape of the vicinity of a top ($\delta = 0°$) of a lobe 18 in (b). This thread forming tap 10 is used to machine an internal thread and has coaxially integrally a shank 12 attached to a main spindle via a chuck not depicted and a working portion 14 that is screwed into a prepared hole for forming an internal thread.

The working portion 14 has a polygonal section, in the present example a substantially octagonal section consisting of outwardly convexed sides and has an outer peripheral surface provided with an external thread 16 that cuts into a surface portion of the prepared hole of a workpiece to cause a plastic deformation for the formation of an internal thread. A thread of the external thread 16 has a sectional shape corresponding to the shape of a groove of an internal tread to be formed and extends along a helix with a lead angle corresponding to the internal thread. Specifically, the working portion 14 includes a thread of the external thread 16 that is provided with eight lobes 18 radially outwardly projecting to cut an internal thread and with eight recesses 20 having a smaller diameter than that of the lobes 18, the lobes 18 and the recesses 20 extending in parallel with the tool center line O and in an axially contiguous manner and arranged alternately and at equiangular intervals around the tool center line O. The major diameter of the top portion of the lobes 18 is set to have a dimension equal to the minor diameter of the internal thread to be formed or greater than that of the internal thread in consideration of a flexible return against the plastic deformation. The working portion 14 is provided with a full thread portion 22 whose thread radial dimensions are constant in the axial direction and with a leading portion 24 whose radial dimensions are reduced toward the tool tip. In the leading portion 24, the whole thread including the effective and minor diameter in addition to the major diameter is reduced in diameter toward the tool tip. The major diameter dimension of the lobes 18 at the tip is set to be substantially equal to or smaller than the prepared hole diameter before tapping. (b) of FIG. 1 depicts a section of the major diameter and the minor diameter corresponding to a single lead when taken along the helix in a root of the groove of the external thread 16.

Figure 1C:
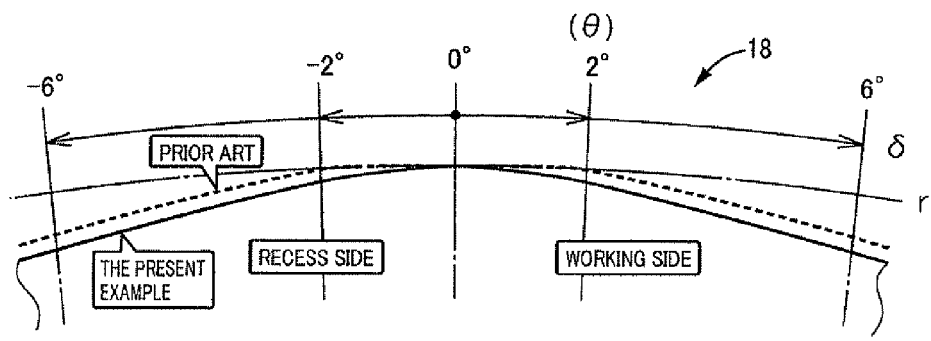

(c) of FIG. 1 is an enlarged view of the shape of the vicinity of the top of the lobe 18 in (b) of FIG. 1. Namely, it is a view, when δ denotes an angle around the tool center line O with 0° being at the lobe top having a maximum radial dimension, depicting a range of the order of δ=±6° respectively to the working side (the clockwise direction in FIG. 1(c)) that is a rotational direction upon the thread forming and to the recess side opposite thereto. In the present example, the working side and the recess side are symmetrical in shape with respect to the angle δ=0° that is at the top of the lobe 18. Although in the prior art a constant margin is provided over a range of the order of δ=±2° with the maximum radial dimension as indicated by a dotted line in FIG. 1(c), the margin is substantially 0 (the angle δ is of the order of 10' or less) in the present example indicated by a solid line. Although (b) and (c) of FIG. 1 depict the shapes in the leading portion 24, the full thread portion 22 also has the lobes 18 and the recesses 20 and is configured in the same manner as that of the leading portion 24. Although FIG. 1(c) depicts the shape of a crest of the thread, its flank also varies around the tool center line O in the same manner as the crest does so that the crest's vicinity of the flank may be regarded as having the same shape as the crest has. An arc r indicated by a long-dashed dotted line in FIG. 1(c) is an arc having the same radial diameter as that of the top (δ=0°) of the lobe 18.

Figure 2:
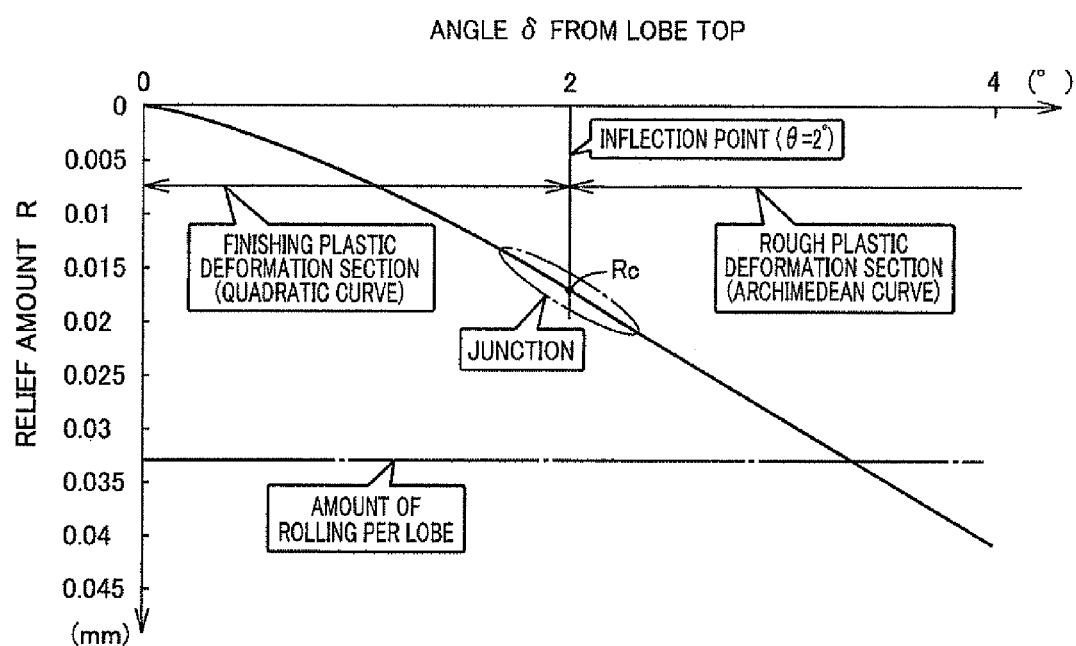
FIG. 2 is a diagram depicting the relief amount R of the vicinity of the top of the lobe in the example of FIG. 1 as a parameter for the angle $\alpha$.

FIG. 2 is a diagram for more specifically explaining the shape of the vicinity of the top of the lobe 18 and is a diagram related to a region extending from the top (δ=0°) toward the working side and depicting a relationship between an angle δ from the top (δ=0°) and a relief amount R that is the amount of recession from the radial dimension at the top (δ=0°). In other words, it corresponds to a development view developing the vicinity of the top of the lobe 18 around the tool center line O, with the relief amount R being a radial interval between the arc r and the solid line representing the present example in (c) of FIG. 1. In FIG. 2, for a finishing plastic deformation section where the angle δ is less than or equal to a predefined inflection point angle θ, the shape of the lobe 18 is varied along a quadratic curve with respect to the angle δ so that the relief amount R increases in a quadratic function manner toward the inflection point angle θ from the top (δ=0°). For a rough plastic deformation section where the angle δ exceeds the inflection point angle θ, the shape of the lobe 18 is varied along an Archimedean curve with a certain clearance angle α1 so that the relief amount R increases linearly with respect to the angle δ. The inflection point angle θ is θ=2° within a range of 0°<θ≤4° in the present example and the clearance angle α1 is α1=6° within a range of 2°≤α1≤12° in the present example. In the present example, the amount of rolling per lobe, i.e., the bite allowance of one lobe 18 is approx. 0.033 mm with its working region being a region of the relief amount R<0.033 and the inflection point angle θ is set within the working range (the angle δ of approx. 3.3° or less) while the rough plastic deformation section is set beyond the working region, e.g., in a region up to of the order of the angle δ=6°. The recess 20 outside the rough plastic deformation section is properly defined such that for example it is formed with a certain radial dimension.

The quadratic curve shape of the lobe 18 in the finishing plastic deformation section is a quadratic curve also in FIG. 2 representing variations of the relief amount R, in which the clearance angle α is defined such that it gradually increases to reach the clearance angle α1 of the rough plastic deformation section in the proximity of the inflection point angle θ, the quadratic curve smoothly connecting to a straight line of the rough plastic deformation section by way of a junction disposed within a predefined range in the proximity of the inflection point angle θ. Specifically, it is defined to be of the order of the clearance angle α=0.1° at the top of the angle δ=0° and to be the clearance angle α=α1 at the inflection point angle of the angle δ=θ. In the present example of α1=6° at θ=2°, the relief amount R of the finishing plastic deformation section is set like a quadratic curve expressed by expression (2) which follows for example. The junction is defined to have an angle δ falling within a range not more than of the order of 30' for example.

$$R = 0.00196 * \delta^2 + 0.00448 * \delta \quad (2)$$

The relief amount R of the rough plastic deformation section is expressed by the expression (1) using the relief amount Rc at the inflection point angle θ prescribed by the quadratic curve. In the present example, the external thread 16 has the nominal diameter D=10 mm, the inflection point angle θ=2°, and the clearance angle α1=6°, resulting in expression (3) below.

$$R = \{10 * \pi * (\delta - 2)/360\} * \tan 6° + 0.00196 * 2^2 + 0.00448 * 2 \quad (3)$$

Figure 3:
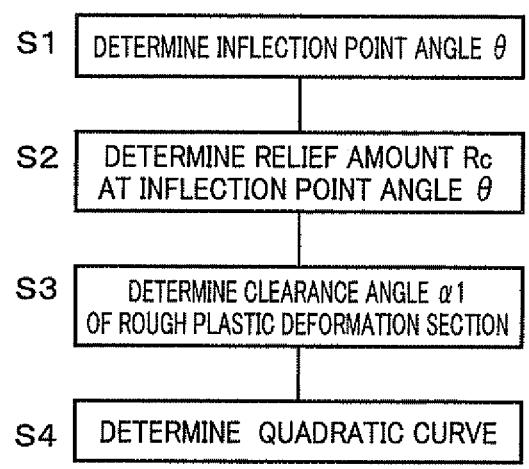
FIG. 3 is a diagram for explaining a setting procedure for the shape of the vicinity of a top of a lobe in the example of FIG. 1.

Such a shape in the vicinity of the top of the lobe 18 is defined based on the variations of the relief amount R with respect to the angle δ as seen in FIG. 2 and, for example, is set in accordance with a procedure depicted in FIG. 3. First, at step S1, the inflection point angle θ is determined. On condition of falling within a range of 0°<θ≤4° and within the working region, the inflection point angle θ is set in consideration of the nominal diameter D and the hardness of the workpiece such that when the nominal diameter D is large, it is reduced than when small whereas when the hardness of the workpiece is high, it is reduced than when low. At step S2, the relief amount Rc at the inflection point angle θ is determined. The relief amount Rc is defined to be smaller than the amount of threading per ridge calculated from the number of lobes and the length of the leading portion 24 for example. At step S3, the clearance angle α1 in the rough plastic deformation section, i.e., the gradient of the relief amount R in FIG. 2 is determined. On condition of falling within a range of 2°≤α1≤12°, the clearance angle α1 is set in consideration of the nominal diameter D and the hardness of the workpiece such that when the nominal diameter D is large, it is increased than when small whereas when the hardness of the workpiece is high, it is increased than when low. At step S4, the quadratic curve of the finishing plastic deformation section is determined such that at the inflection point angle θ the relief amount R is the relief amount Rc and that thereat the clearance angle α is the clearance angle α1.

The lobe 18 of the thus set shape may be formed by mechanically causing a grinding wheel to relatively move closer to or away from the tap material, by use of a cam manufactured corresponding to the variations of the radial dimension (variations of the relief amount R) of the lobe for example. Although the forming work of the external thread 16 generally includes groove grinding of a grooved portion and peripheral grinding of the crest that are separately performed, in the present example the flank formed by the groove grinding and the crest formed by the peripheral grinding are both formed so as to have the relief shape.

In such a thread forming tap 10, substantially zero margin section is provided for the shape on the thread forming side from the top of the lobe 18, with the result that the area of contact with the workpiece upon the thread forming is reduced, lowering the friction torque and heat generation.

Furthermore, the vicinity of the top of the lobe 18 involved in the thread forming is provided with the finishing plastic deformation section and the rough plastic deformation section such that in the rough plastic deformation section apart from the lobe top ($\delta=0°$ the lobe 18 describes the Archimedean curve along which the relief amount R varies linearly with respect to the angle $\delta$ whereas in the finishing plastic deformation section near the top the shape of the lobe 18 is formed so as to vary along the quadratic curve, with the result that the variations of the relief amount R become small in the vicinity of the top on which a large working load acts, to ensure a smooth thread forming work, lowering the friction torque and the heat generation without impairing the durability (against wear, damage, etc.) of the lobe 18.

In this manner, according to the thread forming tap 10 of the present example, the friction torque and heat generation are reduced without impairing the durability (against wear, damage, etc.) of the lobe 18 by virtue of the reduction of the margin section and the specialized shape of the lobe 18, whereupon even when the internal thread is formed under the condition that welding is apt to occur due to high-speed working, a low-lubricative oil (e.g., a water-soluble lubricant not containing chlorine-based high-pressure additives), etc., the occurrence of welding and the wear and damage of the lobe 18 are suppressed, contributing to the improvement of the tool life. In addition, the application to materials has become possible such as relatively hard high-carbon steel or alloy steel (more than approx. 30 HRC) of which thread tapping has hitherto been difficult to perform, without being limited to low-carbon steel having a good extensibility.

In the present example, the inflection point angle $\theta$ is defined within the range of $0°<\theta\leq4°$ and the clearance angle $\alpha 1$ is defined within the range of $2°\leq\alpha 1\leq12°$ whereas the clearance angle $\alpha$ gradually increases toward the inflection point angle $\theta$ in the finishing plastic deformation section so that the clearance angle $\alpha 1$ is achieved in the vicinity of the inflection point angle $\theta$ to smoothly connect to the rough plastic deformation section, whereupon the thread forming work is more smoothly performed, resulting in a proper reduction of the friction torque and of the heat generation without impairing the durability (against wear, damage, etc.) of the lobe 18.

In the present example, the lobe 18 has a symmetrical shape with respect to the top ($\delta=0°$) so that the margin section becomes substantially zero as a whole, with the result that the area of contact with the workpiece becomes small to properly lower the friction torque and the heat generation, ensuring a simple and low-cost configuration with easy designing as compared with the case where the shape of the recess side is set separately from that of the working side.

In this connection, two articles were prepared respectively of the present invention, the prior art, and comparison purposes, whose respective shapes in the vicinity of the top of the lobe 18 differ from one another as depicted in (a) of FIG. 4, and they were subjected to the internal thread tapping under the following working conditions to check up their respective durability (the number of tapped holes), to consequently obtain the results depicted in FIG. 4(*b*). The invention article is the same as the thread forming tap 10 of the present example having the margin of substantially zero. The prior article has a margin within a range of the order of 4° in total on both sides of the lobe top ($\delta=0°$) and has, outside the margin, a lobe shape defined so as to vary along the quadratic curve in the same manner as the finishing plastic deformation section. The comparison article has a margin of substantially zero and has the finishing plastic deformation section and the rough plastic deformation section in the vicinity of the top of the lobe 18, with the inflection point angle $\theta=6°$ at the boundary therebetween and with the clearance angle $\alpha 1=6°$ of the rough plastic deformation section. This comparison article is included in the invention article described in claim 1 of CLAIMS. (a) of FIG. 4 further includes the comparison article added to (c) of FIG. 1 described above.

<<Working Conditions>>
    nominal designation: M10*1.5
    workpiece material: SCM440 (chromium-molybdenum steel in accordance with requirements of HS)
    workpiece hardness: 29 to 31 HRC
    prepared hole diameter: 9.25 mm
    prepared hole depth: 19 mm (through)
    tapping length: 19 mm
    cutting speed: 15 m/min
    number of revolutions: 477 $\text{min}^{-1}$
    feed mechanism: synchro
    lubricant: water-soluble (10 times diluted)
    lubrication method: external In (b) of FIG. 4, the tool life of the prior article was two holes, whereas the tool life of the invention article was approx. 1400 holes and the tool life of the comparison article was approx. 560 holes. According to the invention article and the comparison article, the tool life is improved to a great extent. In particular, the invention article of the inflection point angle $\theta=2°$ acquires more than two-times durability even when compared with the comparison article of the inflection point angle $\theta=6°$. The invention article ends its life by "GP-OUT", i.e., by that a GO thread plug gage (GP) could not fully cut through the internal thread and at that time the radial dimension of the internal thread could not achieve its specified dimension as a result of wear, etc. of the lobe 18 of the external thread 16, whereas the comparison article and the prior article become impossible to work as a result of welding, whereupon it can be seen that welding is properly suppressed by not only providing the finishing plastic deformation section (section of the quadratic curve shape) and the rough plastic deformation section (section of the Archimedean curve shape) in the vicinity of the top of the lobe 18 but also by setting the inflection point angle $\theta$ at the boundary therebetween to 4° or less ($\theta=2°$ in a test article).

FIG. 5 depicts the case where two articles were similarly prepared respectively of the present invention, the prior art, and comparison purposes and where they were subjected to the internal thread tapping under the following working conditions to check up the durability and to measure the tapping torque of the invention article and the prior article, with (a) representing the durability (the number of tapped holes) and (b) representing typical examples of the tapping torque. All of the test articles in this case have the nominal designation of M8*1.25 and the invention article and the prior article have the same shapes as those of (a) of FIG. 4 in the vicinity of the top of the lobe 18. That is, the invention article has the finishing plastic deformation section and the rough plastic deformation section with the inflection point angle $\theta=2°$ at the boundary therebetween and with the clearance angle $\alpha 1=6$ of the rough plastic deformation section. The prior article has a margin within a range of the order of 4° in total on both sides of the lobe top ($\delta=0°$) and has, outside the margin, a lobe shape defined so as to vary along the quadratic curve in the same manner as the finishing plastic deformation section. On the other hand, the comparison article has a margin of substantially zero and has only the rough plastic deformation section (the clearance angle $\alpha 1=6°$) of the Archimedean curve shape extending directly from and arranged on both sides of the lobe top (angle δ=0°), without the finishing plastic deformation section in which the lobe shape varies along the quadratic curve.

<<Working Conditions>> nominal designation: M8*1.25
workpiece material: SCM440 (chromium-molybdenum steel in accordance with requirements of HS)
workpiece hardness: 29 to 31 HRC
prepared hole diameter: 7.4 mm
prepared hole depth: 20 mm (through)
tapping length: 16 mm
cutting speed: 15 m/min
number of revolutions: 600 min$^{-1}$
feed mechanism: tapper (no synchro feed)
lubricant: water-soluble (10 times diluted)
lubrication method: external In (a) of FIG. 5, the tool life of the prior article was less than 100 holes and the tool life of the comparison article was around 1000 holes, whereas the tool life of the invention article was more than 6000 holes. According to the invention article in this manner, the tool life is improved to a great extent. The reason for the durability limit of the prior article was welding which made it impossible to further work, whereas the invention article and the comparison article ended their lives because of "GP-OUT", i.e., because of the fact that GO thread plug gage (GP) could not fully cut through the internal thread and therefore that the radial dimension of the internal thread could not achieve its specified dimension as a result of wear, etc. of the lobe 18 of the external thread 16. In case of the comparison article having the Archimedean curve shape extending from the lobe top (angle δ=0°), the occurrence of welding is properly suppressed due to the reduced area of contact with the workpiece but its durability (wear, damage, etc.) is impaired at the lobe 18, especially, in the vicinity of the top thereof, making it difficult to obtain a sufficient tool life. For this reason, there is a need to provide the finishing plastic deformation section of the quadratic curve shape in the vicinity of the top of the lobe 18.

(b) of FIG. 5 is a diagram depicting the comparison of the tapping torque upon the thread forming between the invention article and the prior article, in which the torque of the invention article is about 10 N·m whereas that of the prior article is about 17 N·m, whereupon the invention article reduces the tapping torque by about 40% as compared with the prior article. The reduction of the tapping torque suppresses the occurrence of the heat generation and welding, contributing to the improved durability.

Although the present example of the present invention has hereinabove been described with reference to the drawings, it is to be understood that this is merely an embodiment and may be implemented in variously altered or improved modes based on the knowledge of those skilled in the art.

REFERENCE SIGNS LIST

10: thread forming tap 16: external thread 18: lobe 20: recess 22: full thread portion 24: leading portion O: tool center line δ: angle from lobe top θ: inflection point angle α1: clearance angle of rough plastic deformation section

The invention claimed is:

1. A thread forming tap having a full thread portion and a leading portion disposed contiguous with the full thread portion and reducing in diameter toward its tip, the full thread portion and the leading portion being provided with an external thread on which lobes and recesses are alternately formed, wherein when, with respect to a shape around a tool center line O of the lobe in the leading portion, δ represents an angle around the tool center line O toward thread forming side from a top of the lobe of 0° having a maximum radial dimension, in a range on at least the thread forming side from the top of the lobe and beyond a working region where the leading portion cuts into a workpiece for thread forming, in a finishing plastic deformation section where the angle δ is less than or equal to an inflection point angle θ that is predefined within the working region, the shape of the lobe is defined so as to vary along a quadratic curve relative to the angle δ so that relief amount R, which is amount of recession from a radial dimension at the top of the angle δ=0°, increases toward the inflection point angle θ, whereas in a rough plastic deformation section where the angle δ is greater than the inflection point angle θ and is defined to exceed the working region, the shape of the lobe is defined so as to vary along an Archimedean curve with a certain clearance angle α1 so that the relief amount R increases linearly relative to the angle δ, and a margin section with a radial dimension equal to the radial dimension of the top is substantially zero or is within a range where the angle δ is less than or equal to 1°.

2. The thread forming tap of claim 1, wherein
in case of absence of the margin, the finishing plastic deformation section is within a range from the top of the angle δ=0° up to the inflection point angle θ, whereas in case of presence of the margin, the finishing plastic deformation section is within a range from an outer end of the margin up to the inflection point angle θ.

3. The thread forming tap of claim 1, wherein
the inflection point angle θ is defined within a range of 0°<θ≤4° and, when the margin is present, within a range outside of the margin, wherein
the clearance angle α1 is defined within a range of 2°≤α1≤12°, and wherein
in the finishing plastic deformation section, the clearance angle α gradually increases toward the inflection point angle θ to reach the clearance angle α1 in the vicinity of the inflection point angle θ to smoothly connect to the rough plastic deformation section.

4. The thread forming tap of claim 2, wherein
the inflection point angle θ is defined within a range of 0°<θ≤4° and, when the margin is present, within a range outside of the margin, wherein
the clearance angle α1 is defined within a range of 2°≤α1≤12°, and wherein
in the finishing plastic deformation section, the clearance angle α gradually increases toward the inflection point angle θ to reach the clearance angle α1 in the vicinity of the inflection point angle θ to smoothly connect to the rough plastic deformation section.

5. The thread forming tap of claim 1, wherein
shape of a recess side opposite to the thread forming side with respect to the top of the angle δ=0° varies symmetrically with that of the thread forming side.

6. The thread forming tap of claim 2, wherein
shape of a recess side opposite to the thread forming side with respect to the top of the angle δ=0° varies symmetrically with that of the thread forming side.

7. The thread forming tap of claim 3, wherein
shape of a recess side opposite to the thread forming side with respect to the top of the angle δ=0° varies symmetrically with that of the thread forming side.

8. The thread forming tap of claim 4, wherein
shape of a recess side opposite to the thread forming side with respect to the top of the angle δ=0° varies symmetrically with that of the thread forming side.

9. The thread forming tap of claim 1, wherein
shape of the lobe having the finishing plastic deformation section and the rough plastic deformation section is shape of one or both of a flank and a crest of the external thread on the lobe.

10. The thread forming tap of claim 2, wherein
shape of the lobe having the finishing plastic deformation section and the rough plastic deformation section is shape of one or both of a flank and a crest of the external thread on the lobe.

11. The thread forming tap of claim 3, wherein
shape of the lobe having the finishing plastic deformation section and the rough plastic deformation section is shape of one or both of a flank and a crest of the external thread on the lobe.

12. The thread forming tap of claim 4, wherein
shape of the lobe having the finishing plastic deformation section and the rough plastic deformation section is shape of one or both of a flank and a crest of the external thread on the lobe.

13. The thread forming tap of claim 5, wherein
shape of the lobe having the finishing plastic deformation section and the rough plastic deformation section is shape of one or both of a flank and a crest of the external thread on the lobe.

14. The thread forming tap of claim 6, wherein
shape of the lobe having the finishing plastic deformation section and the rough plastic deformation section is shape of one or both of a flank and a crest of the external thread on the lobe.

15. The thread forming tap of claim 7, wherein
shape of the lobe having the finishing plastic deformation section and the rough plastic deformation section is shape of one or both of a flank and a crest of the external thread on the lobe.

16. The thread forming tap of claim 8, wherein
shape of the lobe having the finishing plastic deformation section and the rough plastic deformation section is shape of one or both of a flank and a crest of the external thread on the lobe.

* * * * *